United States Patent

Haibara

[11] Patent Number: 6,045,162
[45] Date of Patent: Apr. 4, 2000

[54] JOINT HEAD FOR HIGH-PRESSURE METAL PIPING, AND COMMON RAIL TO WHICH THE PIPING IS TO BE JOINED

[75] Inventor: Yoshinori Haibara, Tagata-gun, Japan

[73] Assignee: USUI Kokusai Sangyo Kaisha Limited, Japan

[21] Appl. No.: 09/005,921

[22] Filed: Jan. 12, 1998

[30] Foreign Application Priority Data

Jan. 14, 1997 [JP] Japan ..................................... 9-017503
Jan. 14, 1997 [JP] Japan ..................................... 9-017504

[51] Int. Cl.$^7$ ........................................................ F16L 9/14
[52] U.S. Cl. .......................... 285/55; 285/133.4; 285/197; 285/332; 285/906
[58] Field of Search ................................ 285/55, 133.4, 285/197, 332, 906, 354, 353

[56] References Cited

U.S. PATENT DOCUMENTS

| | | | |
|---|---|---|---|
| 984,470 | 2/1911 | Carence et al. | 285/332 X |
| 1,852,279 | 4/1932 | Armacost et al. | 285/332 X |
| 1,924,657 | 8/1933 | Saine et al. | 285/55 |
| 2,938,562 | 5/1960 | Watts et al. | 285/55 |
| 4,026,583 | 5/1977 | Gottlieb | 285/55 |
| 4,832,376 | 5/1989 | Sugao . | |
| 4,893,601 | 1/1990 | Sugao . | |
| 4,900,180 | 2/1990 | Takikawa . | |
| 5,120,084 | 6/1992 | Hashimoto . | |
| 5,143,410 | 9/1992 | Takikawa . | |
| 5,169,182 | 12/1992 | Hashimoto . | |
| 5,172,939 | 12/1992 | Takikawa . | |
| 5,667,225 | 9/1997 | Kato . | |
| 5,732,985 | 3/1998 | Suzuki | 285/332 |

FOREIGN PATENT DOCUMENTS

| | | | |
|---|---|---|---|
| 2-80289 | of 1990 | Japan . | |
| 3-177693 | of 1991 | Japan . | |
| 4-175462 | of 1992 | Japan . | |
| 99823 | 6/1923 | Switzerland | 285/332 |

Primary Examiner—Dave W. Arola
Attorney, Agent, or Firm—Anthony J. Casella; Gerald E. Hespos

[57] ABSTRACT

To provide both a high-pressure metal piping capable of preventing the cavitation or the like or the internal fatigue destruction, as might otherwise occur at a joint head at a branch tube due to the repeated internal pressure of a fluid, and capable of eliminating a fear of corrosion even if a corrosive high-pressure fuel is employed, and a common rail to which the piping is jointed. At a joint portion of a thick steel tube having a relatively small diameter, a joint head is formed of a radially enlarged portion having a larger diameter than that of the thick steel tube, and the radially enlarged portion is formed on its inner circumference into a tapered pressure seat which is diverging outward for a receiving seat of the common rail. Preferably, a thin inner tube, as made of a corrosive metal, is fitted on the inner circumference of the thick steel tube all over the length and is terminated at the tapered pressure seat of the thick steel tube. With this construction, according to the invention, the annular recess (or pocket), as might otherwise appear in the inner circumference as the joint head is formed, is eliminated to enhance the internal pressure strength of the joint head thereby to prevent the cavitation or the like or the axial or circumferential cracks in the joint head and to eliminate a fear of corrosion even if a corrosive fuel is employed.

10 Claims, 9 Drawing Sheets

JOINT HEAD FOR HIGH-PRESSURE METAL PIPING, AND COMMON RAIL TO WHICH THE PIPING IS TO BE JOINED

BACKGROUND OF THE INVENTION

1. Field of the Invention

The present invention relates to a joint head of a thick steel tube having a relatively small diameter for a high-pressure metal piping such as a high-pressure fuel injection tube to be arranged for frequent uses as a feed passage of light oil or a corrosive fuel such as dimethyl ether or methanol in a Diesel internal combustion engine, for example, and a common rail such as a main rail or a block rail formed of a high-pressure fuel manifold to which the high-pressure metal piping is jointed so that it may act as a pressure accumulator.

2. Description of the Prior Art

As a mating member of the prior art to which a high-pressure metal piping or the like is to be jointed, such as a common rail, there is the type, as shown in FIG. 9, in which a branch hole 11-2 having a circular section leading to an internal communication passage 11-1 formed in the circumferential wall of a main rail 11 having a circular section is formed into a receiving seat 11-3 opened to the outside. By using a ring-shaped joint fixture 13 enclosing the outer circumference of the main rail 11 in the vicinity of the receiving seat 11-3, a pressure seat 12-3, as formed of a joint head 12-2 of a branch tube 12 which has a passage 12-1 extending therethrough and which is radially enlarged by the buckling to form a frusto-conical or spherical end portion, is brought into abutment against the receiving seat 11-3. The branch tube 12 and the main rail 11 are jointed by the pressure below the neck of the joint head 12-2 by fastening a fastening nut 14, as built in advance on the branch tube 12, into a threaded wall 13-1 protruded from the joint fixture 13. In another type, as shown in FIG. 10, the ring-shaped joint fixture 13 is replaced by a cylindrical sleeve nipple 13a, which is welded or soldered directly to the outer circumferential wall of the main rail 11. The pressure seat 12-3, as formed on the joint head 12-2 of the branch tube 12, is brought into abutment against the receiving seat 11-3 of the main rail 11, and the joint is made by fastening the fastening nut 14 into the sleeve nipple 13a. In another known type, as shown in FIG. 11, a boss portion 11-4, as made integral with the main rail 11, has the branch hole 11-2 communicating with the communication passage 11-1 and the r 11-3 opened to the outside. A washer 15-2, as formed to have a section of general parallelogram, is fastened onto the back face of the frusto-conical pressure seat 12-3, as formed by the joint head 12-2 of the branch tube 12, by a fastening nut 16 onto the boss portion 11-4 thereby to make the fitting joint. Here, reference numeral 15-1 designate a sleeve washer.

In the prior art, however, the joint head 12-2 for the high-pressure metal piping as the branch tube 12, as used in the common rail of this kind, is formed into the frusto-conical shape (or frusto-arcuate shape) forming its outer circumference into the pressure seat 12-3, as shown in detailed in FIG. 12. The joint head 12-2 is ordinarily formed by buckling the end portion of a thick steel tube 12' from the outside in the axial direction by a punch member. The joint head 12-2, as formed by this method, is constructed to have an annular recess (or pocket) 12-4 therein as a result of the bulge of the circumferential wall, as accompanying the buckling of the pressure, and is used with the annular recess 12-4. However, this use is accompanied by the following problems. Due to the fluid pressure violently fluctuating at a high level and at a high speed during the use, there arises a cavitation/erosion or corrosion (as will be called the "cavitation or the like") which is caused in the vicinity of the annular recess 12-4. As shown in FIG. 13, moreover, there arise circumferential cracks $C_1$ which start from the annular recess 12-4 in the joint head 12-2, and axial cracks $C_2$ which surround the annular recess 12-4.

In order to solve these problems, therefore, we have proposed a method (as should be referred to Unexamined Published Japanese Patent No. 2-57709) for forming the inside of the head into a generally flat circumference by burying a metallic ring member in the head. This method has solved the problem of the cavitation of the like due to the fluid pressure in the joint head 12-2, by forming the annular recess 12-4, as formed in the head by the metallic ring member buried in the head, into the generally flat circumference.

From the standpoint of preventing the air pollution, on the other hand, the fuel for the Diesel internal combustion engine has been exemplified in recent years by dimethyl ether or methanol. However, these fuels are made more corrosive than those of the prior art by the water content or the decomposition products thereof. As the high-pressure metal piping to be used with these corrosive fuels, there has been used a dual pipe in which a thin inner tube made of a corrosive resisting metal such as stainless steel is fitted on the inner circumference of the piping. Alternatively, the main rail 11 itself as the common rail is made of the corrosion resisting stainless steel, or the inner circumferences of the receiving seat 11-3, the branch hole 11-2 and the communication passage 11-1 are plated with a corrosion resisting layer.

When the high-pressure metal piping of the aforementioned dual tube is jointed as the branch tube 12 to the main rail 11 by the fastening nut 14 or 16, as shown in FIG. 14, the inner circumference of the passage 12-1 of the thick steel tube 12' is coated with an inner tube 17 made of the aforementioned corrosion resisting metal, and the pressure seat 12-3 is held in abutment against the receiving seat 11-3 of the main rail 11 made of the corrosion resisting material, so that the inner circumference and the pressure seat have a sufficient corrosion resistance. However, an end face 12" of the joint head 12-2 is exposed at the steel skin of the thick steel tube 12' to the outside so that it is early corroded with the corrosive fuel.

SUMMARY OF THE INVENTION

A first object of the invention is to provide a joint head for a high-pressure metal piping, which is freed from the annular recess (or pocket) 12-4 to be formed in the head as a result of the outward expansion of the circumferential wall in accordance with the buckling, as the means for preventing the cavitation or the like, as might otherwise occur in the vicinity of the annular recess 12-4 due to the fluid pressure repeating the violent pressure fluctuations at a high pressure/speed and with a high frequency during the use, and the circumferential or axial cracks $C_1$ or $C_2$, as might otherwise start from the annular recess 12-4 in the joint head 12-2, as shown in FIG. 13, and which is freed from any fear of corrosion even if a corrosive fuel is employed.

A second embodiment is to provide a common rail which can joint such a branch tube 12 having a joint head 12-2, as is freed from the annular recess (or pocket) 12-4 to be formed in the head as a result of the outward expansion of the circumferential wall in accordance with the buckling, as the means for preventing the cavitation or the like, as might otherwise occur in the vicinity of the annular recess 12-4 due to the fluid pressure repeating the violent pressure fluctuations at a high pressure/speed and with a high frequency during the use, and the circumferential or axial cracks, as might otherwise start from the annular recess 12-4 in the joint head 12-2, and which is freed from any fear of corrosion even if a corrosive fuel is employed.

In order to achieve the above-specified first object, according to a first aspect of the invention, there is provided a joint head made of a thick steel tube having a relatively small diameter for a high-pressure metal piping, in which the inner circumference of a radially enlarged portion having a larger diameter than that of the piping is formed into a tapered pressure seat as diverging outward for the receiving seat of a mating member such as a common rail. Moreover: the tapered pressure seat, as diverging outward of the joint head, has an opening diameter $d_1$ satisfying the conditions of the following Relations (1); the radially enlarged portion of the joint head has a thickness T satisfying the conditions of the following Relations (2); and the radially enlarged portion of the joint head has a diameter $D_1$ satisfying the conditions of the following relations (3):

$$d_0 + t \leq d_1 \leq D_0 + t \quad (1),$$

wherein $d_0$: Internal Diameter of Piping, t: Thickness of Piping, and $D_0$: Diameter of Piping;

$$1.2t \leq T \leq 1.8t \quad (2);$$

and $$1.4D_0 \leq D_1 \leq 2D_0 \quad (3).$$

In the first aspect of the invention, the opening diameter $d_1$ of the tapered pressure seat of the joint head is restricted to the size satisfying the conditions of the Relations (1). This is because it is considered that the pressure seat is excessively small for less than $d_0+t$ thereby to degrade the reliability of the sealing effect with the receiving seat of the outer circumference of the mating member such as the common rail to contact with the pressure seat, that the sealing effect is hardly changed for more than $D_0+t$, and the size of the joint head. On the other hand, the thickness T of the radially enlarged portion of the joint head is restricted to the size satisfying the conditions of the Relations (2). This is because it is considered that the rigidity of the joint head is short for less than 1.2t so that the facial pressure of the pressure seat is too low to suffice the reliability, and that the effect is substantially equivalent only with the increase in the weight for more than 1.8t. Moreover, the diameter $D_1$ of the radially enlarged portion of the joint head is restricted to the size satisfying the conditions of the Relations (3). This is because it is considered that the pressure seat is excessively small for less than 1.4 $D_0$, and that the sealing effect is substantially equivalent only with the increase in the size of the joint head for more than 2 $D_0$.

In a joint head for a high-pressure metal piping according to the first aspect, on the other hand, a thin inner tube made of a corrosion resisting metal is so fitted on the inner circumference of the thick steel tube over the whole length as terminates the tapered pressure seat of the thick steel tube.

Moreover, the tapered pressure seat of the inner tube has an opening diameter $d_2$ is preferably no less than 1.2 times of the internal diameter $d_3$ thereof, and the tapered pressure seat of the inner tube more preferably has an opening diameter $d_2$ no less than 1.5 times of the internal diameter $d_3$ of the inner tube and no more than 3 times of the opening diameter $d_1$ of the tapered pressure seat of the thick steel tube.

In the invention, the opening diameter $d_2$ of the tapered pressure seat of the inner tube is no less than 1.2 times as large as the internal diameter $d_3$ of the inner tube. This is because the sealing property on the tapered pressure seat of the inner tube becomes unstable for less than 1.2 $d_3$ so that a leakage or a corrosion is liable to occur due to the contact with the corrosive fuel such as dimethyl ether or methanol. It is, therefore, preferable that the opening diameter $d_2$ of the tapered pressure seat of the inner tube is no less than $1.5d_3$.

On the other hand, the opening diameter $d_2$ of the tapered pressure seat of the inner tube is preferable to be no more than 3 times as large as the opening diameter $d_1$ of the tapered pressure seat of the thick steel tube. This is because the cracks may be formed in the tapered pressure seat of the inner tube when the pressure seat is formed, for more than 3 times of the opening diameter $d_1$ of the tapered pressure seat of the thick steel tube.

In order to achieve the second object, according to a second aspect of the invention, there is provided a common rail, in which a plurality of branch holes are formed in the circumferential wall of a common rail having a communication passage on the axis at an interval in the axial direction, in which a pressure seat, as formed on a joint head formed at the end portion of a branch tube made of a thick steel tube and having a passage communicating with the communication passage, is brought into abutment against a receiving seat, as formed on the circumference of each of the branch holes so that it may be jointed to the branch tube, and in which the branch tube is jointed to the common rail by the pressure at the joint head below its neck by fastening a fastening nut, as built in advance on the branch tube, onto a joint portion made integral with or separate from the common rail, wherein the receiving seat is conically protruded outward, and the inner circumference of a radially enlarged portion, as formed at the end portion of the branch tube and given a larger diameter than that of the branch tube, is formed into a tapered pressure seat, so that the joint is made by fitting the diverging pressure seat, as formed on the joint head of the radially enlarged portion, onto the receiving seat. Moreover, a corrosion resisting metal is mounted on at least the inner circumferences of the receiving seat, the branch hole and the communication passage of the common rail.

In short, according to the second aspect of the invention, the receiving seat at the common rail is formed at the outer side, and the pressure seat at the joint head of the branch tube of the thick steel tube is formed at the inner side so that the pressure seat is fitted to abut against the receiving seat. The thickness of the joint head of the branch tube, and the opening diameter and the taper angle of the diverging pressure seat are set according to the pressure of the fluid, the thickness of the branch tube, and the size and the taper angle of the receiving seat of the common rail. This joint head can be formed by the expanding method.

With the construction thus far described, according to the invention, in the joint head formed by the bucking in the end portion of the thick steel tube, there is not the annular recess (or pocket) which might otherwise be formed by the outer expansion following the buckling working. As a result, it is possible to completely prevent the cavitation or the like, which might otherwise be caused in the vicinity of the annular recess due to the pressure of the fluid flowing at a high pressure/speed during the sue and repeating the violent pressure fluctuations with a high frequency and with a large amplitude, and the circumferential or axial cracks. Moreover, no fear of corrosion need be expected even if the corrosive fuel is employed.

DETAILED DESCRIPTION OF THE PREFERRED EMBODIMENTS

Figure 1:
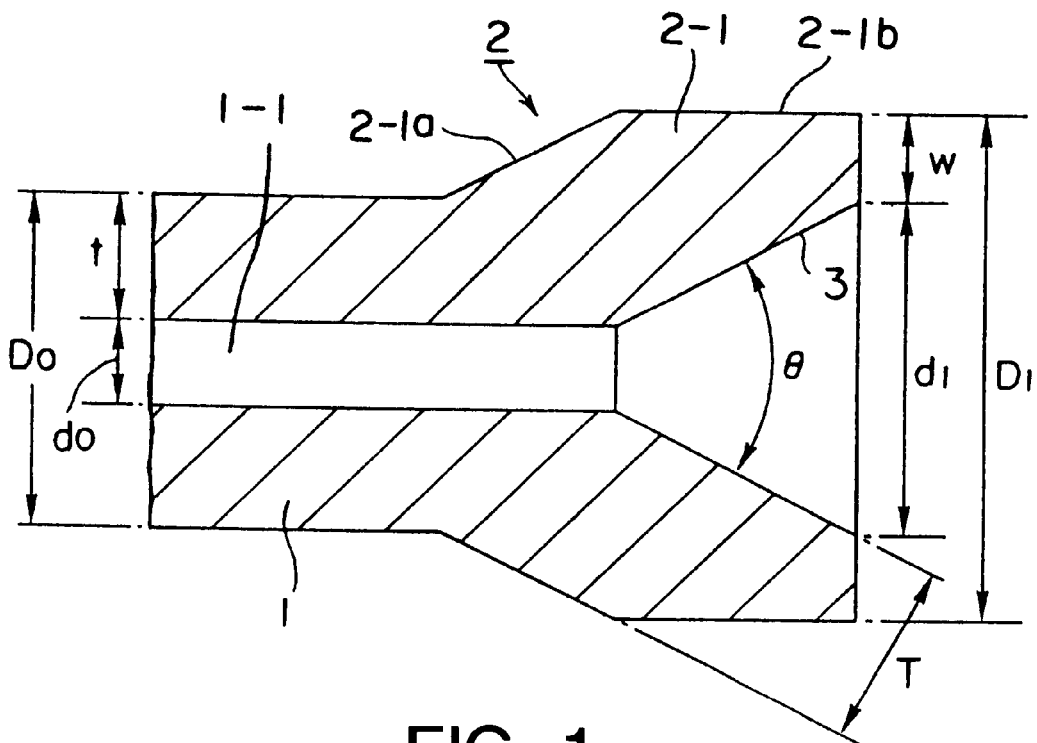
FIG. 1 is a longitudinal section showing one embodiment of a joint head of a high-pressure metal piping according to the invention.

With reference to FIGS. 1 to 4, here will be described an embodiment in which a high-pressure metal piping is made into a branch tube to be jointed to a common rail. Reference numeral 1 designates a thick steel tube having a passage 1-1 formed therethrough; numeral 2 a joint head; numeral 3 a pressure seat; numeral 4 a fastening nut; numeral 5 a common rail as a mating member; numeral 6 a receiving seat; and numeral 7 designates a thin inner tube made of a corrosion resisting metal. Reference letter $D_0$ designates the diameter of the thick steel tube 1; letter $d_0$ the internal diameter of the thick steel tube 1; letter $d_1$ the opening diameter of the tapered pressure seat of the thick steel tube 1; letter $d_2$ the opening diameter of the tapered pressure seat of the inner tube 7; letter $d_3$ the internal diameter of the inner tube 7; letter t the thickness of the thick steel tube 1; letter T the thickness of the joint head 2; and letter w the width of the open end face of the joint head 2.

Specifically, the branch tube joint head 2, as made of the high-pressure metal piping shown in FIG. 1, is made as a high-pressure fuel injection tube of pressure piping carbon steel or stainless steel having a small diameter of 30 mm or less and a large thickness of about 2.5 to 12.0 mm. In the invention, the contact face of the joint head 2 for the receiving seat 6 of the common rail 5 is formed into the tapered pressure seat 3 diverging outward. More specifically, the joint head 2 according to the invention is formed, as shown, into a radially enlarged portion 2-1 which has a larger diameter than that $D_0$ of the thick steel tube 1 and which is further formed at its inner circumference to have the tapered pressure seat 3 diverging for the receiving seat 6 of the common rail 5.

Here, the opening diameter $d_1$ of the tapered pressure seat 3 of the radially enlarged portion 2-1 composing the joint head 2 is made to satisfy the conditions of Relations (1), as described hereinbefore. Specifically, the opening diameter $d_1$ is preferred to be no less than the addition of the internal diameter $d_0$ of the thick steel tube 1 and the thickness t and no more than the addition of the diameter $D_0$ of the thick steel tube 1 and the thickness t. On the other hand, the thickness T and the diameter $D_1$ of the joint head 2 is preferably sized to satisfy the conditions of Relations (2) and (3), respectively, by considering the rigidity of the joint head 2. Here, the width w of the open end face of the joint head 2 is about one half of the thickness t of the thick steel tube 1. On the other hand, the open angle θ of the tapered pressure seat 3, as diverging outward of the radially enlarged portion 2-1, is set normally to about 55 to 60 degrees in accordance with the taper angle of the pressure seat 6 of the common rail 5. Moreover, the lengths of a slope 2-1a and a straight portion 2-1b of the outer circumference of the joint head 2 are suitably set according to the size of the thick steel tube 1.

Figure 2:
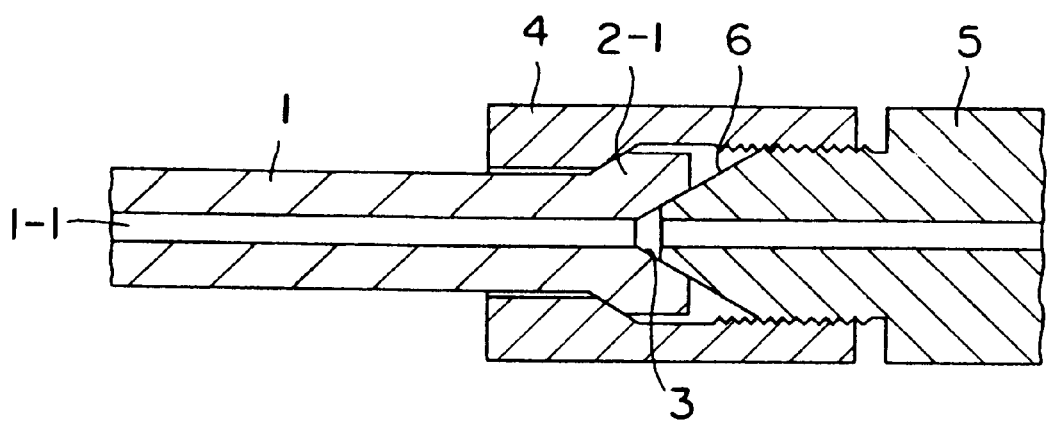
FIG. 2 is a longitudinal section showing one example of the jointed state of the same joint head to its mating member.
Figure 9:
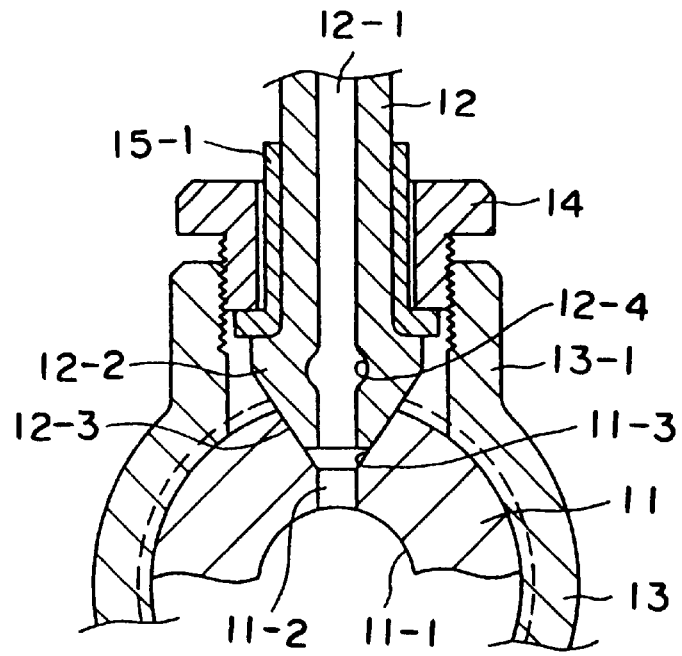
FIG. 9 is a partially cut-off longitudinal section showing an example of the branch tube joint structure of a common rail of the prior art using a ring-shaped joint fixture.
Figure 10:
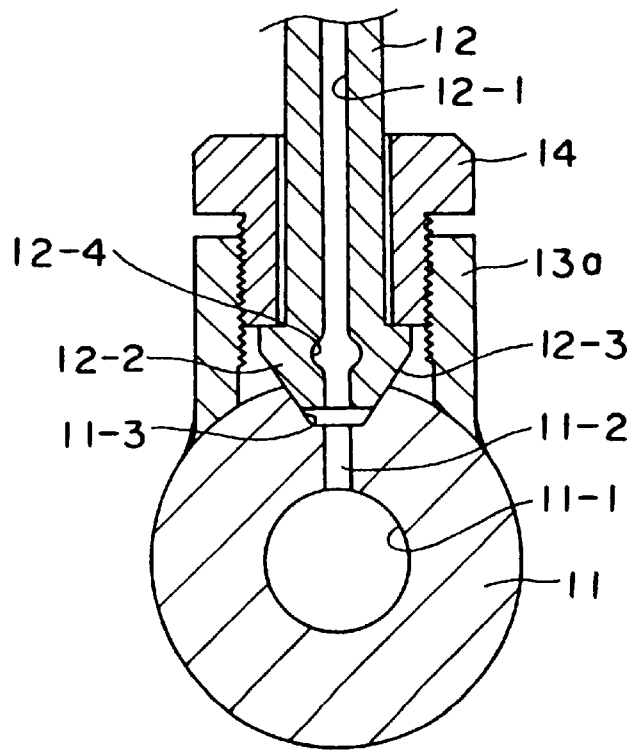
FIG. 10 is a longitudinal section showing an example of a branch tube joint structure, in which a cylindrical sleeve nipple is welded to a main rail, of a common rail of the prior art.
Figure 11:
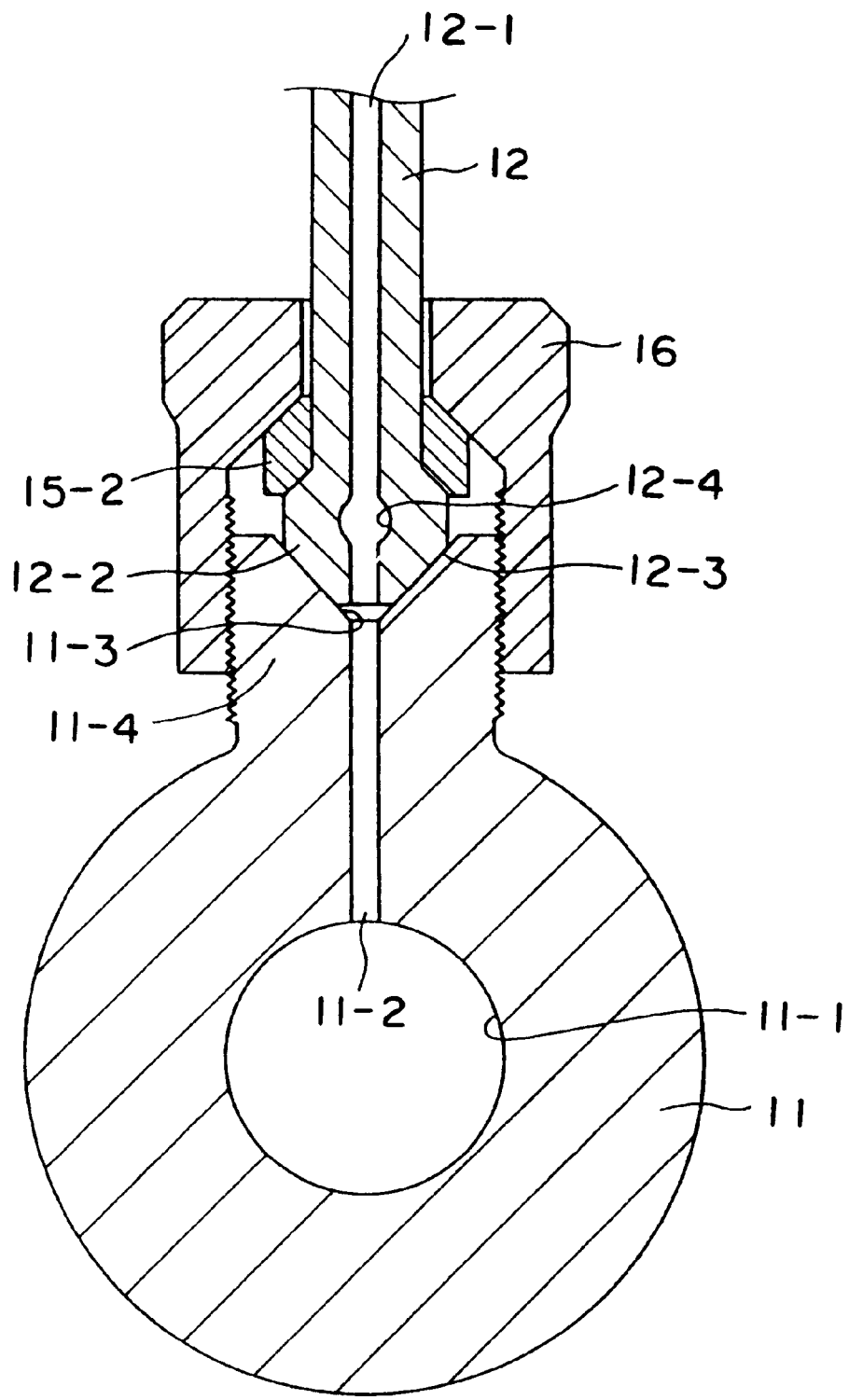
FIG. 11 is a longitudinal section showing an example of a branch tube joint structure, in which a branch hole is formed in a boss portion integrally protruded from a main rail, of a common rail of the prior art.
Figure 12:
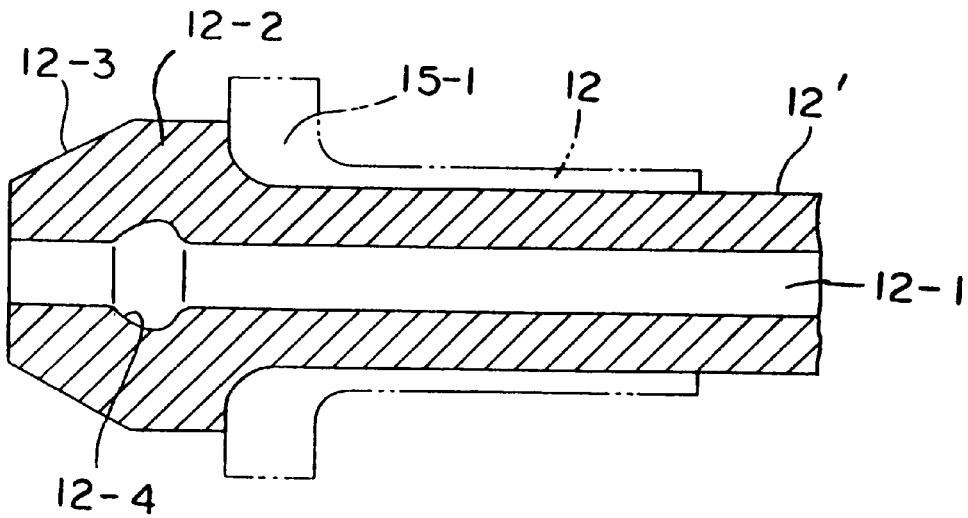
FIG. 12 is an enlarged longitudinal section showing one example of the joint head of a high-pressure metal piping of the prior art.
Figure 13:
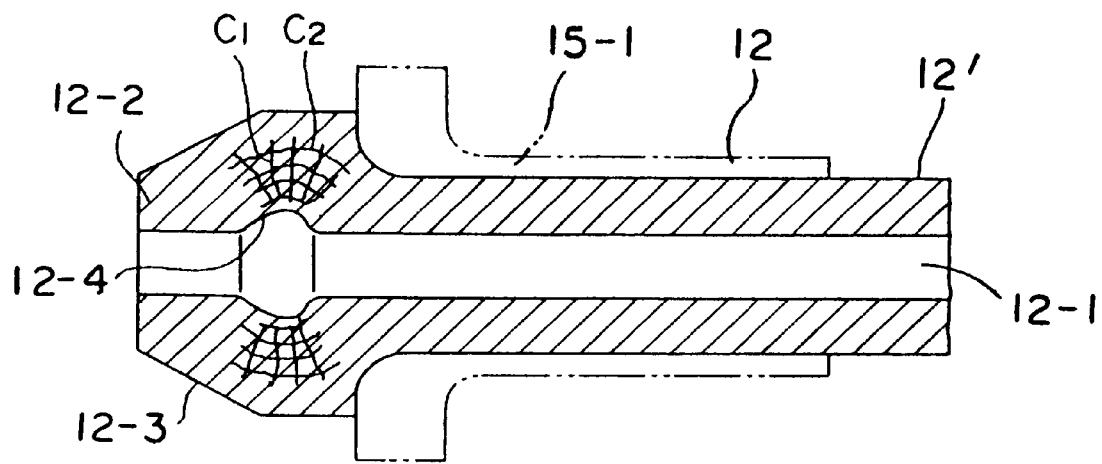
FIG. 13 is an enlarged longitudinal section showing the cracks to be formed in the joint head of the high-pressure metal piping shown in FIG. 12.
Figure 14:
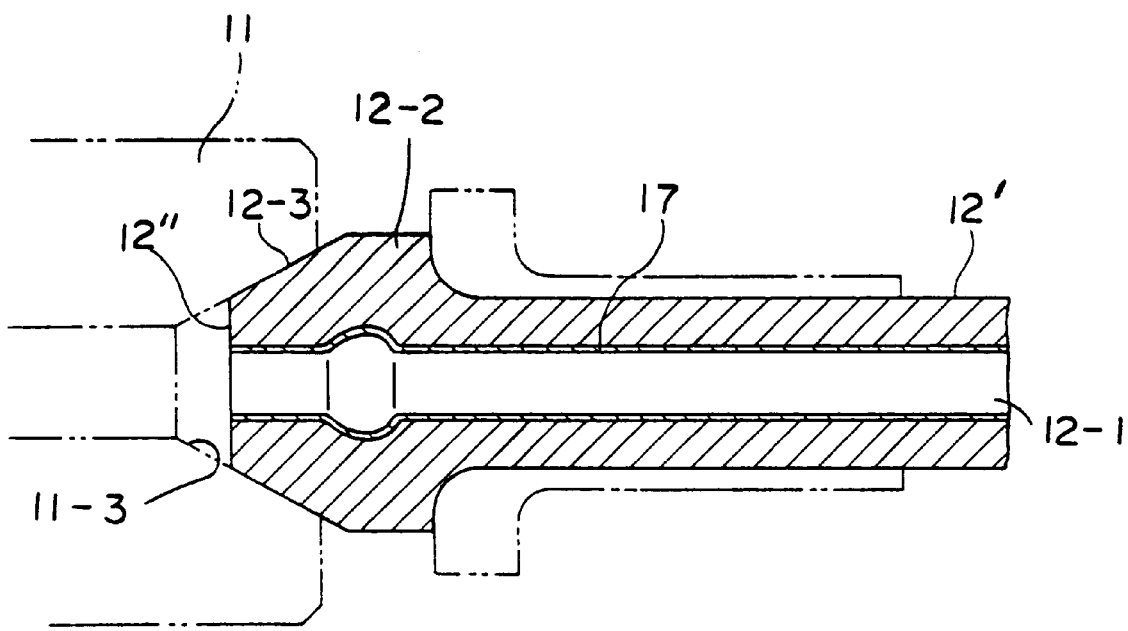
FIG. 14 is an enlarged longitudinal section showing another example of the joint head of the high-pressure metal piping of the prior art.

Next, one example of the jointed state of the joint head 2 to the common rail 5 will be described with reference to FIG. 2. The pressure seat 6 on the outer circumference of the common rail 5 is brought into abutment against the pressure seat 3 in the inner circumference of the joint head 2 of the thick steel tube 1, and the fastening nut 4 is fastened to press-fit the pressure seat 3 in the inner circumference of the joint head 2 and the pressure seat 6 on the outer circumference of the common rail 5. In other words, the joint structure is made such that the tapered pressure seat 3, as diverging outward of the joint head 2 of the thick steel tube 1, is brought into contact with the pressure seat 6 of the common rail 5 and is press-fitted on the pressure seat 6 on the outer circumference of the common rail 5 by fastening the fastening nut 4. Here, it is quite natural that the aforementioned washer or sleeve, as shown in FIG. 9 or 11, may be provided between the slope 2-1a and the fastening nut 4.

Figure 3:
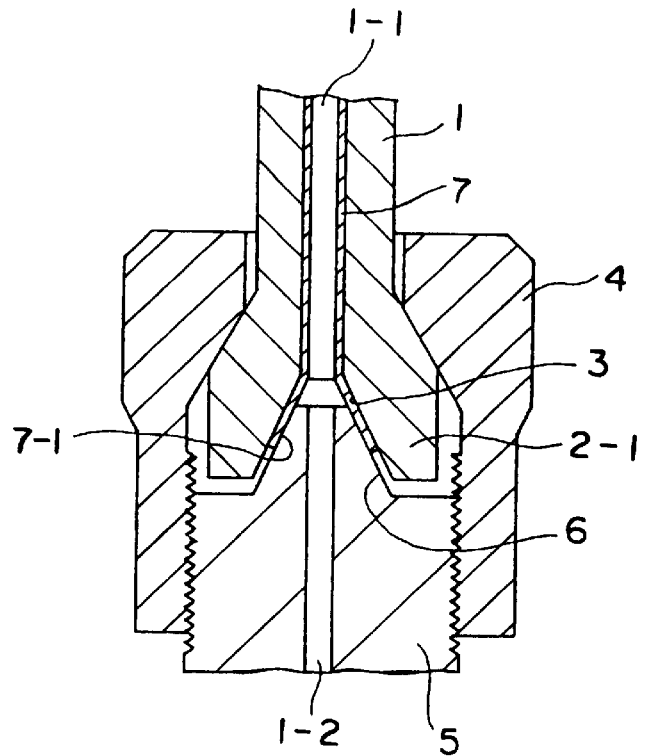
FIG. 3 is a longitudinal section showing another example of the jointed state of a joint head of a high-pressure metal piping to its mating member in accordance with the invention.

When a corrosive fuel such as dimethyl ether or methanol is employed in the Diesel internal combustion engine, on the other hand, the high-pressure metal piping can adopt a construction, as shown in FIG. 3, according to the invention.

In FIG. 3, more specifically, a dual metal tube is made by forming a tapered pressure seat 7-1 terminating at the tapered pressure seat 3 of the thick steel tube 1 having the aforementioned shape, and by press-fitting the thin inner tube 7, which is made of a corrosion resisting metal such as a nickel alloy, e.g., stainless steel, Inconel, Incoloy or Hastelloy, titanium, a titanium alloy, e.g., 6A14V, 6A16V2Sn, 6A12S4Zr2Mo or 8A11Mo1V, or a cobalt alloy, e.g., Heintz alloy, over the whole length of the inner circumference of a passage 1-1 of the thin steel tube 1. Here, the pressure seat 7-1 of the inner tube 7 has to terminate such that it is clamped at least by the pressure seat 6 of the common rail 5, but such that it does not extend all over the pressure seat 3 of the joint head 2.

On the other hand, here will be described later the construction of the common rail 5 of the case in which the corrosive fuel such as dimethyl ether or methanol is employed.

Figure 4:
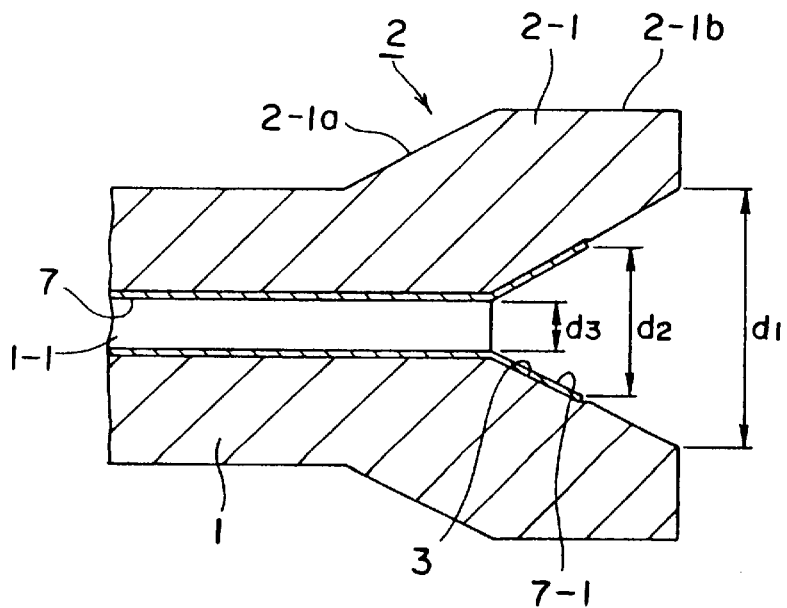
FIG. 4 is an enlarged longitudinal section for explaining the sizing conditions of a tapered pressure seat of an inner tube shown in the example of FIG. 3.

Here, the opening diameter $d_2$ of the tapered pressure seat 7-1 of the aforementioned inner tube 7 is preferred, as shown in FIG. 4, to be larger by 1.2 times or more than the internal diameter $d_3$ of the inner tube 7. For less than 1.2 $d_3$, the tapered pressure seat 7-1 of the inner tube 7 is so narrow as to make the sealing property unstable so that the corrosion is liable to be caused by the leakage of or the contact with the corrosive fuel such as dimethyl ether or methanol. Thus, the opening diameter $d_2$ of the tapered pressure seat 7-1 of the inner tube 7 is more preferably no less than 1.5 $d_3$.

On the other hand, the opening diameter $d_2$ of the tapered pressure seat 7-1 of the inner tube 7 is preferred to be no smaller by 3 times or less than the opening diameter $d_1$ of the tapered pressure seat 3 of the thick steel tube 1. This is because if the 3 times of the opening diameter $d_1$ of the tapered pressure seat 3 of the thick steel tube 1 is exceeded, cracks may occur in the tapered pressure seat 7-1, when formed, of the inner tube 7.

Description referring to FIGS. 1 to 4 has been made by exemplifying the high-pressure metal piping as the branch tube to be jointed to the common rail. However, the high-pressure metal piping can be employed as a high-pressure fuel injection tube in the fuel injection for a Diesel internal combustion engine. In this instant, the joint head 2 may be jointed to a nozzle holder in place of the common rail 5 by means of the fastening nut 4.

A common rail according to the invention for jointing the high-pressure metal piping, as shown in FIGS. 1 to 4, will be described with reference to FIGS. 5 to 8. In FIGS. 5 to 8: reference numeral 8 designates a main rail as the common rail; numeral 8' a block rail as the common rail; numeral 9 a sleeve nipple; numeral 9' a ring-shaped joint fixture; and numeral 10 a washer.

Figure 5:
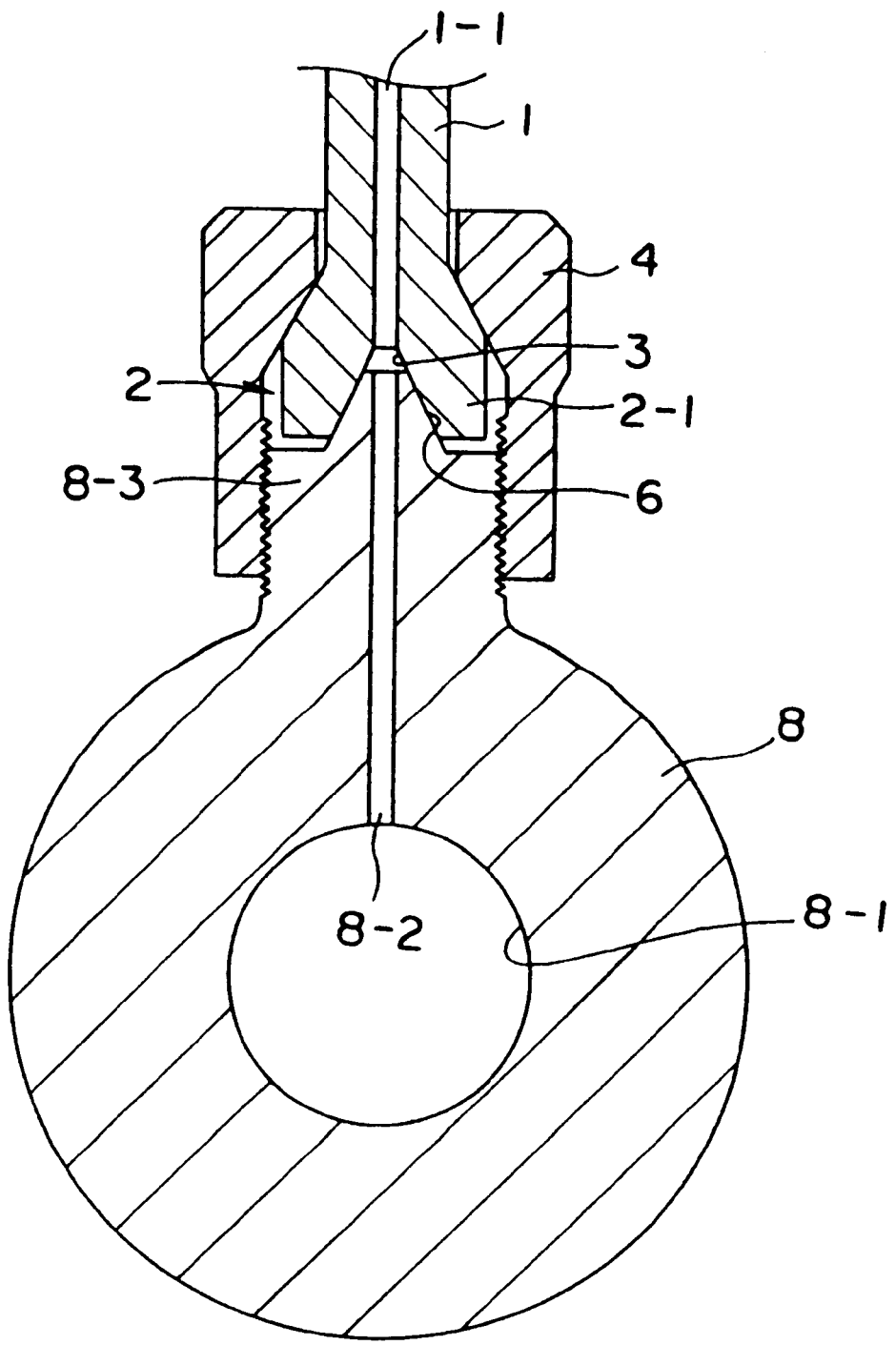
FIG. 5 is a longitudinal section showing another embodiment of a joint structure, in which the joint head of the high-pressure metal piping of FIG. 1 is jointed as a branch tube, in a common rail of the invention.

As shown in FIG. 5, the main rail 8 or the common rail is made of a relatively thick metal tube of STS480 having a diameter of 28 mm and a thickness of 9 mm. A communication passage 8-1 is formed in the axis of the main rail 8. At a predetermined interval in the axial direction, there are protruded a plurality of boss portions 8-3 which have branch holes 8-2 formed in the circumferential wall and communicate with the communication passage 8-1 while holding an interval in the axial direction and which have frusto-conical pressure seats 6 on their outer end portions for providing joint portions.

Here, the branch tube, made of the thick steel tube 1, is a branch tube or fixture. This branch tube is jointed to the main rail 8, as has been described with reference to FIGS. 1 to 4, by fitting the tapered pressure seat 3, as diverted outward of the radially enlarged portion 2-1 of the joint head 2 of the branch tube on the pressure seat 6 of the main rail 8, and by fastening the fastening nut 4 on the boss portion 8-3.

Figure 6:
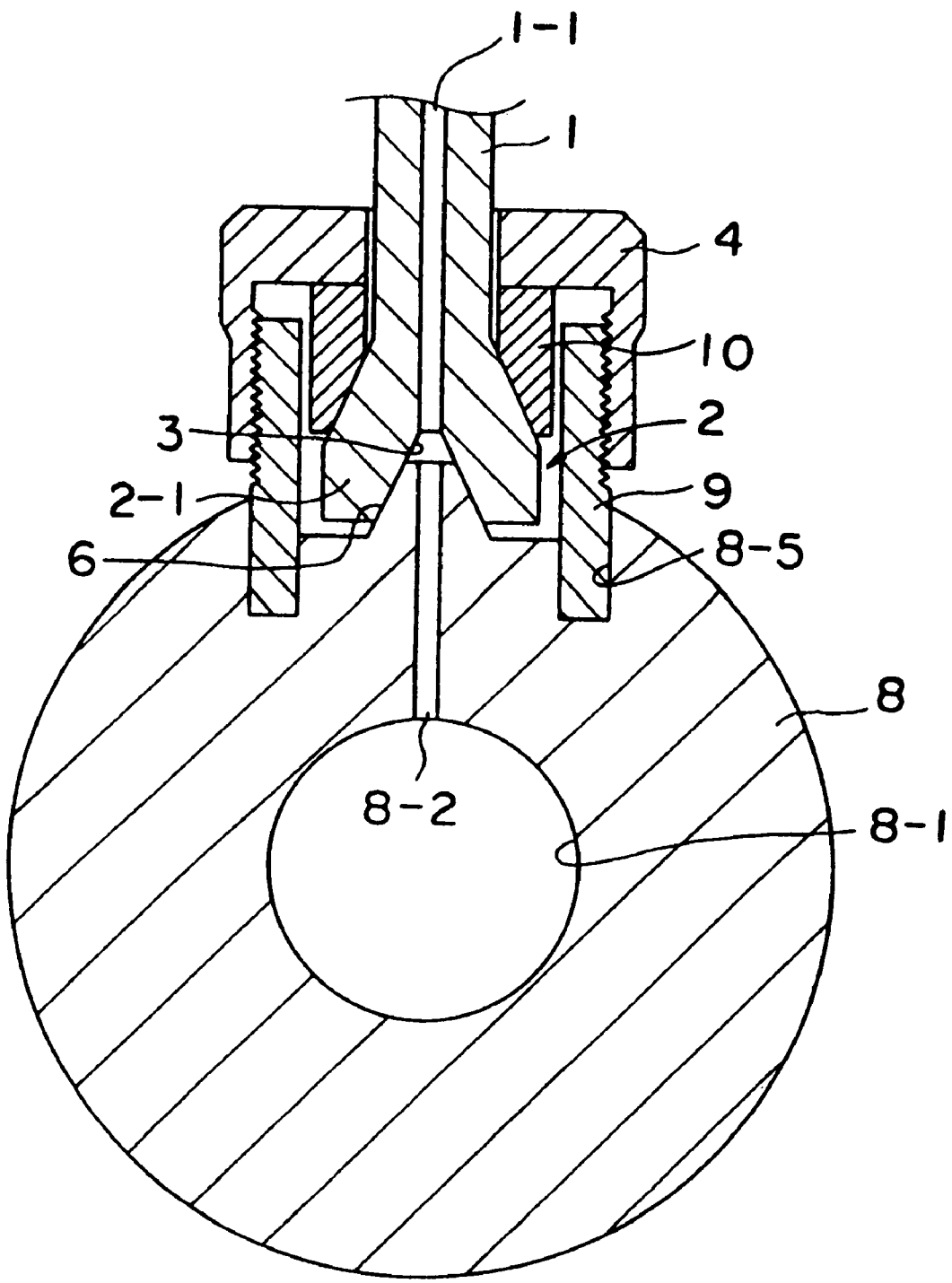
FIG. 6 is similar to FIG. 5 but shows another example of the joint structure, in which a cylindrical sleeve nipple is employed in a joint portion, in the common rail of the invention.

The branch tube joint structure of the common rail, as shown in FIG. 6, employs the sleeve nipple 9 as the joint portion. In this example, in the outer side of the frusto-conical pressure seat 6 protruded from the side of the main rail 8 and having the branch hole 8-2 communicating with the communication passage 8-1, there is formed a fitting groove 8-5 which is made concentric with the branch hole 8-2 to have a suitable depth, such that it encloses the pressure seat 6. The base end portion of the cylindrical sleeve nipple 9, as having a threaded outer circumference to be screwed in the fastening nut 4 build in advance in the branch tube through the washer 10, is fitted in the fitting groove 8-5, and its fitted portion is welded or solder to the fitting groove 8-5. The tapered pressure seat 3, as diverging outward of the radially enlarged portion 2-1 of the joint head 2 of the branch tube, is fitted on the pressure seat 6 of the main rail 8. The washer 10, as built on the back face of the joint head 2, is fastened and press-fitted by the fastening nut 4 which is screwed on the sleeve nipple 9.

Figure 7:
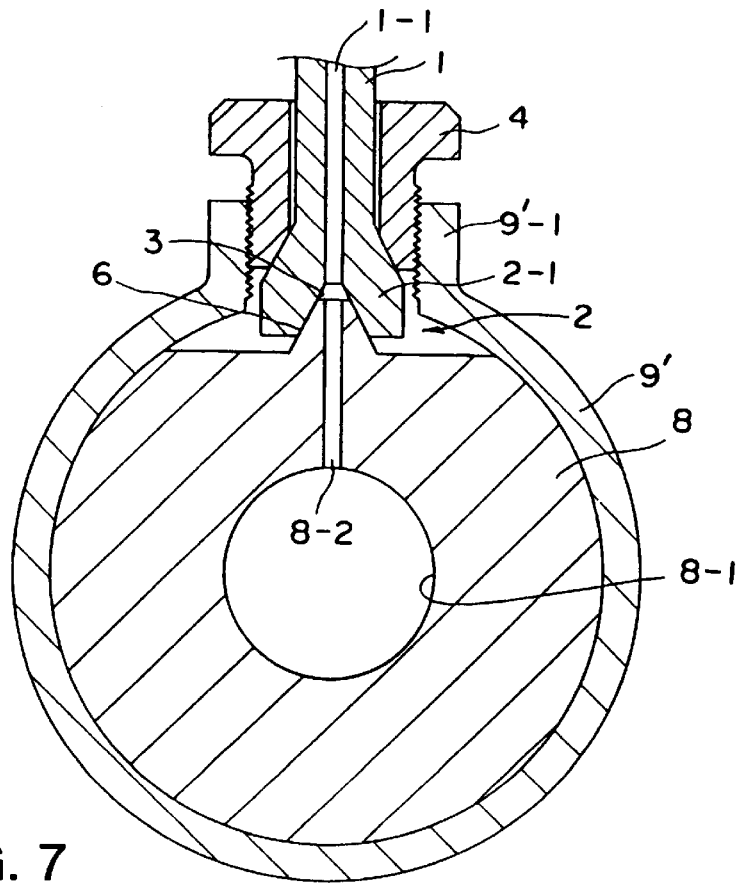
FIG. 7 is similar to FIG. 5 but shows another example of the joint structure, in which a ring-shaped fixture is employed in a joint portion, in the common rail of the invention.

In the branch tube joint structure of the common rail shown in FIG. 7, on the other hand, there is employed the ring- or block-shaped joint fixture 9' (although FIG. 7 shows an embodiment in which the ring-shaped joint fixture is employed). By using the ring-shaped joint fixture 9' acting another joint portion which enclosed the outer circumference of the main rail 8 in the vicinity of the frusto-conical pressure seat 6 having the branch hole 8-2 communicating with the communication passage 8-1 formed in the main rail 8, the tapered pressure seat 3, as diverging outward of the radially enlarged portion 2-1 of the joint head 2 of the branch tube, is fitted on the pressure seat 6 of the main rail 8. The fastening nut, as built in advance in the branch tube, is fastened into abutment against a threaded wall 9'-1 protruded from the joint fixture 9', to joint the branch tube 1 to the main rail 8 by the pressure at the joint head 2 below its neck.

Figure 8:
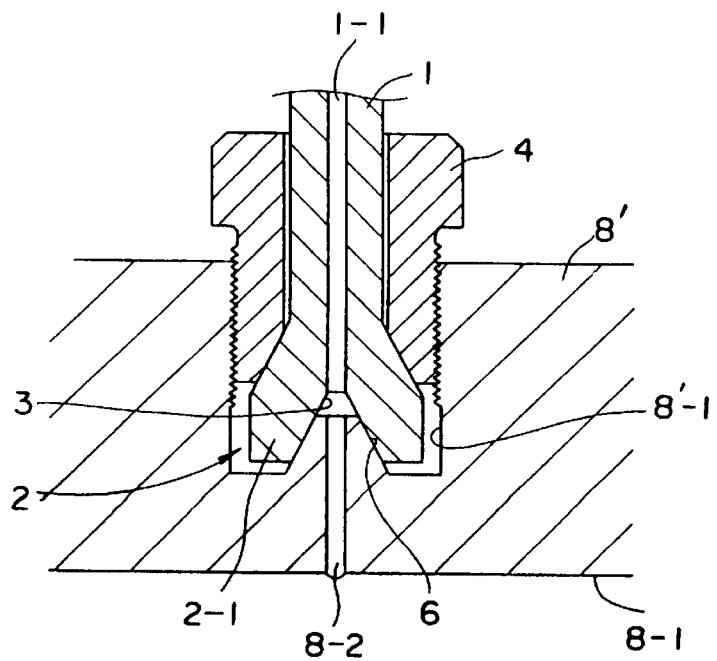
FIG. 8 is a longitudinal side elevation showing another example of the joint structure, which is applied to a block rail, in the common rail of the invention.

Next, the branch tube joint structure of the common rail, as shown in FIG. 8, is an embodiment in which the invention is applied to the block rail 8' as the common rail. In the bottom of a joint hole 8'-1 as the joint portion, as formed at the side of the block rail 8', there is protruded the frusto-conical pressure seat 6 which has the branch hole 8-2 communicating with the communication passage 8-1 of the block rail 8'. The tapered pressure seat 3, as diverging outward of the radially enlarged portion 2-1 of the branch tube, is fitted in abutment on the pressure seat 6 of the block rail 8'. Then, the fastening nut 4 is fastened in the joint hole 8'-1.

When a corrosive high-pressure fuel such as dimethyl ether or methanol is employed in the common rail, on the other hand, the corrosion by the corrosive high-pressure fuel is prevented according to the invention by constructing the branch tube of the thick steel tube 1 into the dual tube, as shown in FIGS. 3 and 4, and by making the main rail 8 (or the block rail 8') of the corrosion resisting material such as stainless steel or by forming a plated layer of a corrosion resisting material such as Ni, Cr or Cu or they alloy at least on the inner circumferences of the pressure seat 3, the branch hole 8-2 and the communication passage 8-1.

As has been described hereinbefore, the joint head of the high-pressure metal piping according to the invention and the common rail, to which the high-pressure metal piping is to be jointed, are given the structure which is freed from any annular recess (or pocket), as might otherwise be formed by the shaping such as the buckling working. As a result, the internal pressure strength of the joint head can be enhanced to completely prevent the cavitation or the like, as might otherwise occur in the vicinity of the annular recess due to the high-pressure fluid when the joint head or the common rail is arranged for use, or the cracks in the axial or circumferential direction. Another excellent effect is that no fear of corrosion is estimated even if the corrosive fuel is employed. Thus, the invention has a remarkably rich utility.

I claim:

1. A joint head for a high-pressure metal piping, made of a thick steel tube having a passage with an internal diameter ($d_0$), an external diameter ($D_0$) and a radial thickness (t), said joint head including a radially enlarged end portion having an outside diameter ($D_1$) larger than external diameter ($D_0$) of said piping, said enlarged end portion forming a tapered concave pressure seat diverging outwardly from the passage, said pressure seat having a maximum opening diameter ($d_1$) selected such that $$d_0+t \leq d_1 \leq D_0+t,$$

said enlarged end portion having an open end face with a radial width (w) about one-half as large as the radial thickness (t) of the piping.

2. A joint head for a high-pressure metal piping according to claim 1, wherein the radially enlarged portion of said joint head has a thickness T satisfying the following conditions:

$$1.2t \leq T \leq 1.8t.$$

3. A joint head for a high-pressure metal piping according to claim 1, wherein the radially enlarged portion of said joint head has a diameter $D_1$ satisfying the following conditions:

$$1.4D_0 \leq D_1 \leq 2D_0.$$

4. A joint head for a high-pressure metal piping according to claim 1, wherein said tapered pressure seat has an opening angle $\theta$ of about 55 to 60 degrees.

5. A joint head for a high-pressure metal piping, made of a thick steel tube having a passage with an internal diameter ($d_0$), an external diameter ($D_0$) and a radial thickness (t), said joint head including a radially enlarged end portion having an outside diameter ($D_1$) larger than external diameter ($D_0$) of said piping, said enlarged end portion forming a tapered concave pressure seat diverging outwardly from the passage, said pressure seat having a maximum opening diameter ($d_1$) selected such that $$d_0+t \leq d_1 \leq D_0+t,$$

a thin inner tube made of a corrosion resisting metal fitted to inner circumferential regions of said thick steel tube defining said passage and defining portions of said tapered pressure seat adjacent said passage, said thin inner tube defining an internal diameter ($d_3$) along said passage and wherein said inner tube has an opening diameter ($d_2$) on the tapered pressure seat no less than 1.5 times the internal diameter ($d_3$) of said inner tube and no more than one-third of the opening diameter ($d_1$) of the tapered pressure seat of said thick steel tube.

6. A joint head for a high-pressure metal piping, made of a thick steel tube having a passage with an internal diameter ($d_0$), an external diameter ($D_0$) and a radial thickness (t), said joint head including a radially enlarged end portion having an outside diameter ($D_1$) larger than external diameter ($D_0$) of said piping, said enlarged end portion forming a tapered concave pressure seat diverging outwardly from the passage, said pressure seat having a maximum opening diameter ($d_1$) selected such that $$d_0+t \leq d_1 \leq D_0+t,$$

thin inner tube made of a corrosion resisting metal fitting on the inner circumference of said fixed steel tube along said passage and extending onto the tapered pressure seat of said thick steel tube, wherein said corrosion resisting metal of said inner tube is selected from the group consisting of a nickel alloy, stainless steel, titanium, a titanium alloy and a cobalt alloy.

7. A common rail comprising:

a circumferential wall having an axis, a communication passage extending through said circumferential wall along the axis, a plurality of branch holes formed through said circumferential wall and communicating with said communication passage, said circumferential wall further comprising a plurality of convex conical receiving seats protruding outwardly on said circumferential wall and surrounding said branch holes;

a plurality of branch tubes made of a thick steel tube and having a passage extending therethrough, each said branch tube having a concave conical pressure seat extending into the joint head and communicating with the passage of the branch tube, the concave pressure seat of each said branch tube being mounted to one of said receiving seats conically protruding outwardly on said circumferential wall; and a fastening nut for each said branch tube for urging the tapered pressure seat of the branch tube onto the conically protruded receiving seat surrounding the respective branch hole on the circumferential wall.

8. A common rail according to claim 7, wherein a corrosion resisting metal is mounted on at least the inner circumferences of said receiving seat, said branch hole and said communication passage of said common rail.

9. The common rail of claim 7, further comprising a plurality of boss portions projecting transversely from said circumferential wall, said branch holes extending through said boss portions, and said receiving seats conically protruding outwardly from ends of said boss portions remote from said communication passage, each said boss portion having an array of threads thereon, said fastening nuts being threadedly engaged respectively with the boss portions for tightly urging the pressure seat of the respective branch tube into engagement with the receiving seat of the respective boss portion.

10. A common rail according to claim 7, wherein the circumferential wall includes a plurality of internally threaded recesses extending therein, said internally threaded recesses respectively concentrically surrounding the receiving seats conically protruding outwardly and surrounding the branch holes, the fastening nuts each including an array of external threads, said external threads of each of said fastening nuts engaging the respective internally threaded recesses of the circumferential wall for urging the respective branch tube inwardly, such that the pressure seat of the branch tube engages the respective receiving seat of the circumferential wall.

* * * * *